United States Patent Office 2,850,399
Patented Sept. 2, 1958

2,850,399

PROCESS FOR ELABORATING A MATERIAL BASED ON CACTACEOUS WOODY TEXTURE

Alfredo Bernardo Blanco, Buenos Aires, Argentina

No Drawing. Application October 14, 1954
Serial No. 462,365

3 Claims. (Cl. 106—163)

The present invention relates to a process for elaborating a material based on cactaceous woody texture, the object of which is that of promoting the industrialization of certain types of cactuses and particularly those called teasel.

As known, in the mountainous zones of all the continents of the globe cactuses are plentiful, and by their extraordinary development they may be classified as giants; and the proliferation of their seed is such that, by the action of wind currents their progress acquires the character of a plague, difficult to be combatted in view of the increase it assumes as an autochthonous plant.

It has been proved lately that the cactuses of those zones comprise in their texture a woody substance of incalculable value, as they possess properties which in many respects and particularly due to their spongy nature, are superior to that of cork.

Effectively, the cactuses are constituted by spheroidal cellules which, notwithstanding fibrous or filamentous appearance when separated and then reunited by any means, they acquire alveolar characters of such sponginess, that the resulting material is inert, athermanous, anti-sound reflecting and a poor thermal and electrical conductor in general.

From the comparison made with cork, the material elaborated from cactus shows a superior index to that derived from the cork tree in that which refers to the stated qualities; therefore as semi-pressed bodies, as well as small particle fragments, the cactus is suitable for thermic insulation, blocking sound, anti-sound separations and all sorts of barriers where is it desired to eliminate transmissions and nodal reflexes.

Trials have been effected by various methods for elaborating cacteous substances with satisfactory results, but they have proved to be so difficult and expensive in relation to their yield, as to make them uneconomical and impracticable.

This is due to the nature of the plant; as it is very thorny, it must be uncombed before the crumbling which is carried out under dry conditions. This is done in order to avoid the thorns constituting a danger for the workmen. The elimination of thorns is effected with machetes or cutting tools, handled with great ability, implying considerable work, which increases the elaboration cost.

On the other hand, as the cactus contains fluosilicates or other silicates dissolved in its sap and water, it becomes solidified during drying for crumbling and is converted into petrified substances. These substances, being particles of extraordinary hardness, acquire the character of abrasives of such power that any grindstone or tool employed in the reducing of the woody texture suffered such wear and tear that its useful life was very short.

After extensive studies on this particular point and in view of the fact that in the initial preparation the thorns may be eliminated by modifying their state, various tests have been made with the result that the application of a flame to the thorns has been found best. The flame destroys the thorns by carbonization without in any way damaging or altering the woody texture of the cactus plants.

In the reduction step very good results have also been obtained, for, in an equally simple manner, the problem of the abrasiveness of the silicates has been solved, permitting operation with any crumbler without danger of rapid wear and tear.

Therefore, instead of operating with plants of dried cactus, the milling is done when the plant still contains a high percentage of water, the plants being fragmented in their "green" state, i. e. when their mineral phases have not reached the petrified state, as, in solution, the silicates do not present any danger.

In this way, the conditioning of the cactus is very simple, economical and without risks, so that, after washing and bleaching, a material may be obtained at a very low cost, irrespective of the ultimate treatment to which it is submitted.

The process of the invention comprises, as an initial step, the carbonizing of the thorns, whilst same are still "in situ." This operation is particularly easy by using for example a portable flame-blower with which the uncombing of great quantities of cactus may be carried out in a short time. As may be inferred, this operation does not affect the internal constituent texture of the plant, as the great quantity of water accumulated in its cells is an excellent protection against the temperature of the flame.

When this previous step has been effected, i. e. the destruction of thorns, the plants are very easily cut or uprooted and transported to the factory.

The stalks thus liberated of thorns, are then milled until fine grain particles are obtained. The milling is done withuot difficulties of any sort, as the material lends itself well to this purpose.

The product is then dried by pressure or any other known means of dehydration and the drying process is completed by the action of heat, until the water content, which originally was 91%, is reduced to only 10% to 20%.

After this, the material is left standing for a period of between 10 and 15 days, during which the product reaches a certain stabilization with the destruction of the cellular life of the matter. When this step is completed, the chemical treatment begins, which comprises a first step of immersion of the material in a bath of sodium hypochlorite in solution at 0.5° Baumé. Afterwards it is dried. The object of this operation is that of decoloring and deodorizing the substance, as well as that of increasing its stability. In order to eliminate the alkaline excess, it is then submitted to treatment in an acid bath, preferably diluted hydrochloric acid.

These steps complete the processing, after which other steps may be pursued in many different ways. The corpuscular material may be dyed, agglomerated with adequate resins ("as for instance those with a formaldehyde basis"). It may be molded and different shapes may be given thereto.

From the after treatment will result the final characteristics which the product will exhibit.

Undoubtedly when carrying out the present invention, modifications of the described process may be introduced, without this implying a departure of the fundamental principles which are clearly stated in the following claims.

I claim:

1. A process for making a sound- and heat-insulating cork-like material from cactus comprising projecting a flame against the live cactus thorns "in situ" until said thorns are completely carbonized, cutting the cactus plant thereafter through its stem, milling the cut cactus to reduce it to small granular particles still containing most of their water of constitution, drying said particles until the spheroid cells thereof lose their compactness, and deodorizing and stabilizing the dried particles by immersing them in a sodium hypochlorite bath.

2. The process of claim 1, in which the deodorized and stabilized cactus particles, after subjection to the sodium hypochlorite bath, are neutralized in an acid bath.

3. The process of claim 2, in which the neutralized cactus particles are formed into a shaped body of insulation.

References Cited in the file of this patent

UNITED STATES PATENTS

| | | |
|---|---|---|
| 354,109 | Dudley | Dec. 14, 1886 |
| 1,394,162 | Gebhardt | Oct. 18, 1921 |
| 2,203,205 | Rawlings | June 4, 1940 |

OTHER REFERENCES

Prickly Pear, Encycl. Americana, vol. 22, 1920 edition, page 569.

Farmer's Bulletin 1072 (copies of the foregoing publications may be found in Div. 5 of the Pat. Off.).

"Cane Sugar Handbook," Spencer et al., 8th ed. (1944), page 16.

Cruse: "Journal of Economic Botany" 3, 115 (1949).